US012707444B2

(12) United States Patent
Liu

(10) Patent No.: US 12,707,444 B2
(45) Date of Patent: Aug. 11, 2026

(54) CARRIER SWITCHING METHOD AND APPARATUS, AND TERMINAL DEVICE AND READABLE STORAGE MEDIUM

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 283 days.

(21) Appl. No.: 18/291,034

(22) PCT Filed: Jul. 23, 2021

(86) PCT No.: PCT/CN2021/108246

§ 371 (c)(1),
(2) Date: Jan. 22, 2024

(87) PCT Pub. No.: WO2023/000329

PCT Pub. Date: Jan. 26, 2023

(65) Prior Publication Data

US 2024/0357568 A1 Oct. 24, 2024

(51) Int. Cl.
*H04W 72/0453* (2023.01)
*H04W 72/51* (2023.01)

(52) U.S. Cl.
CPC ....... *H04W 72/0453* (2013.01); *H04W 72/51* (2023.01)

(58) Field of Classification Search
CPC .......................... H04W 72/0453; H04W 72/51
See application file for complete search history.

(56) References Cited

U.S. PATENT DOCUMENTS

2011/0026495 A1* 2/2011 Lee ....................... H04L 5/0042 370/335
2012/0051309 A1 3/2012 Kim et al.
2019/0349155 A1* 11/2019 Xu ........................ H04L 5/0042
2020/0337008 A1* 10/2020 Tang ..................... H04L 5/0048
2021/0037607 A1* 2/2021 Hamidi-Sepehr ..... H04W 24/08
(Continued)

FOREIGN PATENT DOCUMENTS

CN 101848466 A 9/2010
CN 101945452 A 1/2011
CN 103118395 A 5/2013
(Continued)

OTHER PUBLICATIONS

Li et al., CN 108024357 A, The secondary carrier management method of multi-carrier polymerizing and base station (English), May 11, 2018, ip.com, total 16 pages. (Year: 2018).*
ZTE, Discussion on Cross-Carrier Scheduling from SCell to PCell, 3GPP TSG RAN WG1 Meeting #104, R1-2100110, Jan, 25-Feb. 5, 2021, (Year: 2021).*
Huawei, Discussion on SCell PDCCH scheduling P S Cell PDSCH or PUSCH, 3GPP TSG RAN WG1 Meeting #104-e, R1-2100193, Jan. 25, 2021 (Year: 2021).*
(Continued)

*Primary Examiner* — Michael A Keller
*Assistant Examiner* — Chhian (Amy) Ling
(74) *Attorney, Agent, or Firm* — Finnegan, Henderson, Farabow, Garrett & Dunner, L.L.P.

(57) ABSTRACT

A carrier switching method, includes: determining a candidate secondary carrier based on a selection strategy; and in response to an available resource existing on the candidate secondary carrier, determining the candidate secondary carrier as a target secondary carrier, wherein the target secondary carrier is a switched secondary carrier in a carrier switching scenario of a physical channel.

16 Claims, 3 Drawing Sheets

(56) References Cited

U.S. PATENT DOCUMENTS

| | | | | |
|---|---|---|---|---|
| 2021/0392627 | A1* | 12/2021 | Kim | H04W 72/11 |
| 2023/0397191 | A1* | 12/2023 | Bagheri | H04W 72/52 |

FOREIGN PATENT DOCUMENTS

| | | | |
|---|---|---|---|
| CN | 104618963 | A | 5/2015 |
| CN | 107465493 | A | 12/2017 |
| CN | 107613531 | A | 1/2018 |
| CN | 108024357 | A | 5/2018 |
| CN | 108112033 | A | 6/2018 |
| CN | 109728890 | A | 5/2019 |
| CN | 110719606 | A | 1/2020 |

OTHER PUBLICATIONS

International Search Report of International Application No. PCT/CN2021/108246, dated Apr. 19, 2022, 4 pages.

Notification to Grant Patent Right for Invention for Chinese Application No. 202180002281.2, dated Jan. 5, 2026, 5 pages.

ZTE, "Discussion on HARQ-ACK enhancements for eURLLC", 3GPP TSG RAN WG1 Meeting #105-e, R1-2104326, e-Meeting, May 10-27, 2021, 10 pages.

NTT DOCOMO, Inc., "Discussion on HARQ-ACK feedback enhancements for Rel. 17 URLLC", 3GPP TSG RAN WG1 #105-e, R1-2105693, e-Meeting, May 10-May 27, 2021, 4 pages.

The First Office Action for Chinese Application No. 202180002281.2, dated Jul. 23, 2025, 18 pages.

* cited by examiner

CARRIER SWITCHING METHOD AND APPARATUS, AND TERMINAL DEVICE AND READABLE STORAGE MEDIUM

CROSS-REFERENCE TO RELATED APPLICATION

The application is a U.S. National Stage of International Application No. PCT/CN2021/108246 filed on Jul. 23, 2021, the entire content of which is incorporated herein by reference.

TECHNICAL FIELD

The present disclosure relates to the communication field, and in particular, to a carrier switching method, apparatus, terminal device and readable storage medium.

BACKGROUND

Under the subject of Industrial Internet of Things (IIoT) or Ultra Reliable and Low Latency Communication (URLLC) in R17, it is proposed to enhance the Hybrid Automatic Repeat request-Acknowledgment (HARQ-ACK) feedback.

Usually, the Physical Uplink Control Channel (PUCCH) resource corresponding to the HARQ-ACK feedback can be obtained through the K1 indication. If the PUCCH resource corresponding to K1 is unavailable, the feedback operation is discarded, or retransmission is triggered, or the feedback operation is delayed according to a certain rule.

However, the above processing manners may have a certain impact on the reliability and delay of the HARQ-ACK feedback.

SUMMARY

Embodiments of the present disclosure provide a carrier switching method, apparatus, terminal device, and readable storage medium, and the technical solutions are as follows.

According to an aspect of the present disclosure, a carrier switching method is provided, the method including:

- determining a candidate secondary carrier based on a selection strategy;
- in response to an available resource existing on the candidate secondary carrier, determining the candidate secondary carrier as a target secondary carrier, where the target secondary carrier is a switched secondary carrier in a carrier switching scenario of a physical channel.

In another aspect, a carrier switching apparatus is provided, the apparatus including: a secondary carrier selection module and a carrier switching module;

- the secondary carrier selection module is configured to determine a candidate secondary carrier based on a selection strategy;
- the carrier switching module is configured to determine the candidate secondary carrier as a target secondary carrier in response to an available resource existing on the candidate secondary carrier, where the target secondary carrier is a switched secondary carrier in a carrier switching scenario of a physical channel.

In another aspect, a terminal device is provided, the terminal device including:

- a processor;
- a transceiver connected to the processor;
- where the processor is configured to load and execute executable instructions to implement the carrier switching method described in the above-mentioned embodiments of the present disclosure.

In another aspect, a chip is provided, the chip includes a programmable logic circuit and/or program instructions, and when the chip is running, it is used to implement the carrier switching method described in the above-mentioned embodiments of the present disclosure.

In another aspect, a computer-readable storage medium is provided. At least one instruction, at least one program, a code set or an instruction set is stored in the computer-readable storage medium. The at least one instruction, at least one program, code set or instruction set is loaded and executed by the processor to implement the carrier switching method described in the above-mentioned embodiments of the present disclosure.

In another aspect, a computer program product or computer program is provided, the computer program product or computer program including computer instructions stored in a computer-readable storage medium. The processor of the computer device reads the computer instructions from the computer-readable storage medium, and the processor executes the computer instructions, so that the computer device executes the carrier switching method described in the above-mentioned embodiments of the present disclosure.

The beneficial effects brought by the technical solutions provided by the embodiments of the present disclosure at least include the following.

In the carrier switching scenario of the physical channel, the terminal device selects a candidate secondary carrier based on the selection strategy to determine whether it is available, and if there is an available resource on the candidate secondary carrier, the candidate secondary carrier is used as the target secondary carrier after carrier switching. Therefore, when the physical channel resource of the primary carrier is unavailable, the carrier switching behavior of the terminal device is clarified, and the terminal device is helped to switch to an available target secondary carrier, thereby ensuring the reliability and timeliness of transmission on the physical channel.

BRIEF DESCRIPTION OF THE DRAWINGS

The accompanying drawings of the present disclosure will be briefly introduced below. Obviously, the drawings in the following description are only some embodiments of the present disclosure. For those skilled in the art, other embodiments can also be obtained.

DETAILED DESCRIPTION

In order to make the purpose, technical solutions and advantages of the present disclosure clearer, the implementations of the present disclosure will be further described in detail below in conjunction with the accompanying drawings.

Figure 1:
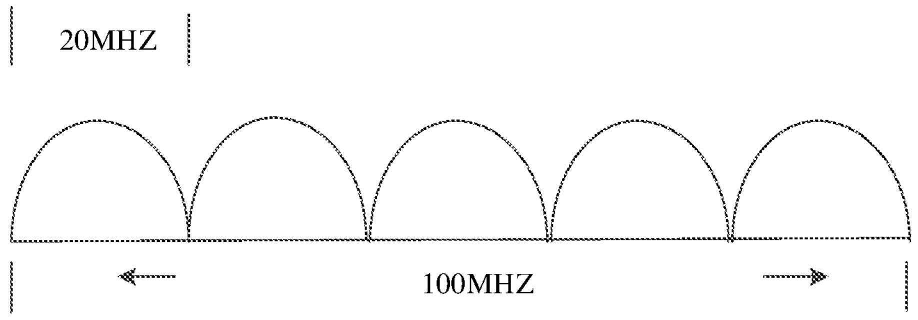
FIG. 1 shows a schematic diagram of carrier aggregation provided by an exemplary embodiment of the present disclosure.

First, a brief introduction to the nouns involved in the embodiments of the present disclosure is given:

Carrier aggregation: Carrier Aggregation (CA) is to aggregate two or more carrier units (Component Carrier, CC) together to support a larger transmission bandwidth. As shown in FIG. 1, the CA technology can aggregate 2 to 5 carriers together to achieve a maximum transmission bandwidth of 100 MHz, effectively improving the uplink and downlink transmission rates.

The Primary Cell (PCell) is a cell where the terminal device establishes the initial connection, or a cell where the RRC connection is reestablished, or a primary cell designated during the cell handover process. The PCell is responsible for Radio Resource Control (RRC) communication with the terminal device. The component carrier corresponding to the PCell is called a Primary Component Carrier (PCC).

The secondary Cell (SCell) is added during RRC reconfiguration to provide additional radio resources, and there is no RRC communication between the SCell and the terminal device. The component carrier corresponding to the SCell is called a Secondary Component Carrier (SCC).

There is only one primary carrier at a time, and a plurality of secondary carriers are allowed, for example, 3 secondary carriers. The network may set the temporarily unused secondary carrier to an inactive state according to needs, so as to reduce the power consumption of the terminal device; it may also quickly activate the secondary carrier to meet the transmission needs. The primary carrier of the terminal device cannot be deactivated; the terminal device can only perform data transmission on the activated carrier, and only limited measurements are supported on the deactivated carrier.

K1: a time relationship between downlink data transmission and corresponding HARQ codebook feedback (Timing between DL data reception and corresponding acknowledgment).

Specifically, if the sending end sends downlink data to the receiving end via the PDSCH in a time unit n, the receiving end transmits the uplink feedback information (for example, HARQ-ACK feedback) corresponding to the downlink data to the sending end on the transmission resource corresponding to a time unit n+K1.

Exemplarily, when the above sending end is a base station and the receiving end is a terminal device, the base station may pre-configure a set of K1 values, such as {1, 2, 3, 4}, and send it to the terminal device through RRC signaling. Then the DCI is sent to the terminal device, which is used to inform the terminal device which one in the set the specific value of K1 allocated for the data transmission is.

Figure 2:
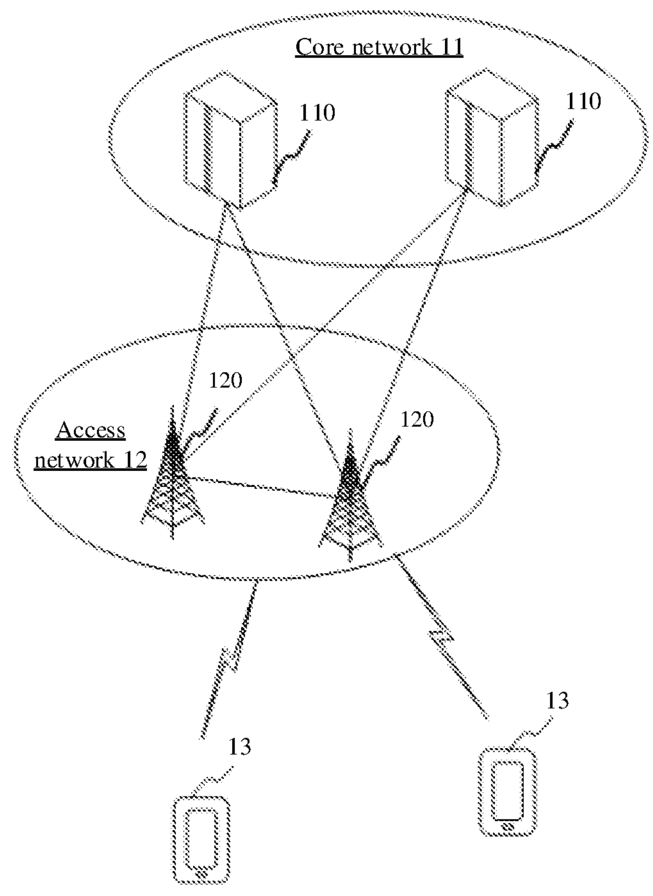
FIG. 2 shows a block diagram of a communication system provided by an exemplary embodiment of the present disclosure.

FIG. 2 shows a block diagram of a communication system provided by an exemplary embodiment of the present disclosure. The communication system may include: a core network 11, an access network 12 and a terminal device 13.

The core network 11 includes several core network devices 110. The core network device 110 includes an Access and Mobility Management Function (AMF), a Session Management Function (SMF) and a User Plane Function (UPF) and other devices. AMF is used to control the access authority, handover and other functions of the terminal device, SMF is used to provide continuity of the server and uninterrupted user experience of the server, such as: IP address and anchor point changes, etc.

The access network 12 includes several access network devices 120. The access network device 120 may be a base station, and the base station is an apparatus deployed in an access network to provide a wireless communication function for the terminal device. The base station may include various forms of macro base stations, micro base stations, relay stations, access points and so on. In systems using different radio access technologies, the names of devices with base station functions may be different, for example, in the Long Term Evolution (LTE) system, it is called eNodeB or eNB; in the 5G New Radio (NR) system, it is called gNode B or gNB. With the evolution of communication technology, the description of the name “base station” may change. For convenience in the embodiments of the present disclosure, the foregoing apparatuses for providing wireless communication functions for the terminal device are collectively referred to as an access network device.

The terminal device 13 may include various handheld devices with wireless communication functions, vehicle-mounted devices, wearable devices, computing devices or other processing devices connected to a wireless modem, as well as various forms of terminals (User Equipment, UE), Mobile Station (MS), terminal (terminal device) and so on. For convenience of description, the devices mentioned above are collectively referred to as a terminal device. The access network device 120 and the terminal device 13 communicate with each other through a certain air interface technology, such as a Uu interface. 5G-based industrial sensors, video surveillance, and wearable devices do not need to support such a large bandwidth, especially the industrial sensors, which only need a few megabytes of transmission bandwidth. This type of terminal device may be classified as a new terminal type in the enhancement of subsequent 5G versions, and corresponding technical feature improvements will be made.

Under the IIoT/URLLC topic in R17, it is proposed to enhance the HARQ-ACK feedback, especially HARQ-ACK feedback of the Semi-Persistent Scheduling (SPS) Physical Downlink Shared Channel (PDSCH) transmission. Usually, the PUCCH resource corresponding to the HARQ-ACK feedback may be obtained through the K1 indication. If the PUCCH resource corresponding to K1 is unavailable, the feedback operation is discarded, or retransmission is triggered, or the feedback operation is delayed according to a certain rule, which may affect the feedback reliability and delay to a certain extent.

If the base station supports carrier aggregation, in the carrier aggregation scenario, if the PUCCH resource of the primary cell is not available, carrier switching can be performed, and the HARQ-ACK feedback can be switched to the PUCCH of the secondary cell. In this way, it is unnecessary to delay the feedback on the primary cell or trigger HARQ-ACK retransmission, thereby reducing the HARQ-ACK feedback delay and ensuring the reliability and feedback efficiency of the HARQ-ACK feedback. In addition, in some scenarios, carrier switching can also reduce interference and achieve load balancing.

In the related art, the carrier switching behavior of the terminal device has not been clarified yet.

In the embodiment of the present disclosure, in the carrier switching scenario of the physical channel, the terminal device selects a candidate secondary carrier based on the selection strategy to determine whether it is available, and if there is an available resource on the candidate secondary carrier, the candidate secondary carrier is used as the target secondary carrier after the carrier is switched, so that when the physical channel resource of the primary carrier is not available, the carrier switching behavior of the terminal device is clarified, and the terminal device is helped to switch to the available target secondary carrier, thereby ensuring the reliability and timeliness of transmission on the physical channel.

In the following, the carrier switching method provided by the present disclosure will be exemplarily described through the following embodiments.

Figure 3:
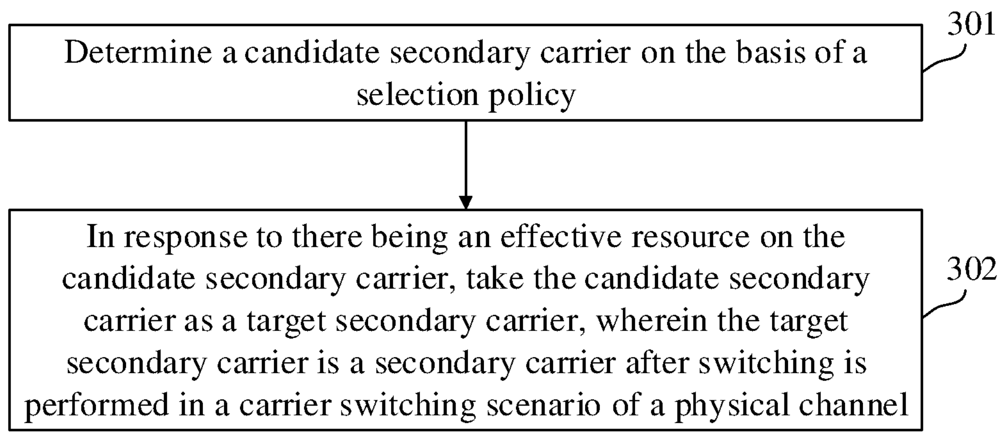
FIG. 3 shows a flowchart of a carrier switching method provided by an exemplary embodiment of the present disclosure.

The present disclosure provides a carrier switching method. With reference to FIG. 3, which shows a flowchart of a carrier switching method provided by an exemplary embodiment of the present disclosure, the method is applied to the terminal device as an example. As shown in FIG. 3, the method includes the following steps.

In step 301: a candidate secondary carrier is determined based on a selection strategy.

Schematically, in the case that there is no available resource of the physical channel on the primary carrier, the terminal device selects a candidate secondary carrier from a plurality of secondary carriers based on a selection strategy.

The selection strategy is a strategy used to assist the terminal device in selecting a candidate secondary carrier from a plurality of secondary carriers. The selection strategy may be called: a switching strategy, a priority strategy, a first strategy, a strategy, etc., which is not limited in the embodiments of the present disclosure. Optionally, the selection strategy is predefined by a communication standard.

Optionally, based on the definition of the selection strategy, each secondary carrier corresponds to a switching priority, and the terminal device selects the candidate secondary carrier from a plurality of secondary carriers according to an order of the switching priorities from high to low.

In step 302: in response to an available resource existing on the candidate secondary carrier, the candidate secondary carrier is determined as a target secondary carrier, where the target secondary carrier is a switched secondary carrier in a carrier switching scenario of a physical channel.

Schematically, the terminal device determines whether the candidate secondary carrier is available. If the candidate secondary carrier is available, that is, if there is an available resource on the candidate secondary carrier, the terminal device uses the candidate secondary carrier as the target secondary carrier to perform carrier switching.

The available resource refers to a resource supporting transmission on a physical channel, and the resource includes at least one of the following resource types: a time domain resource, a frequency domain resource, or a code domain resource.

Optionally, the physical channel includes at least any of the following channels.

PUCCH.

That is, the carrier switching method shown in the embodiments of the present disclosure is applicable to PUCCH carrier switching.

Physical Uplink Shared Channel (PUSCH).

That is, the carrier switching method shown in the embodiments of the present disclosure is applicable to PUSCH carrier switching.

Physical downlink control channel (PDCCH).

That is, the carrier switching method shown in the embodiments of the present disclosure is applicable to PDCCH carrier switching.

Physical Downlink Shared Channel (PDSCH).

That is, the carrier switching method shown in the embodiments of the present disclosure is applicable to PDSCH carrier switching.

To sum up, in the carrier switching method provided by the embodiments of the present disclosure, in the carrier switching scenario of the physical channel, the terminal device selects the candidate secondary carrier based on the selection strategy to determine whether it is available. If there is an available resource on the candidate secondary carrier, the candidate secondary carrier is used as the target secondary carrier after carrier switching, so that when the physical channel resource of the primary carrier is unavailable, the carrier switching behavior of the terminal device is clarified, and the terminal device is helped to switch to an available target secondary carrier, thereby guaranteeing the reliability and timeliness of transmission on the physical channel.

Optionally, the selection strategy includes at least one of the following strategies:

First selection strategy.

The first selection strategy includes: selecting a first secondary carrier having the same SubCarrier Spacing (SCS) as the primary carrier as a candidate secondary carrier.

Schematically, the SCS of the primary carrier is 15 KHz, if the PUCCH is collided and unavailable, and there is a first secondary carrier with SCS=15 KHz, the first secondary carrier is used as a candidate secondary carrier. The first secondary carrier may be a Time Division Duplexing (TDD) carrier, or may be a Frequency Division Duplexing (FDD) carrier.

Second selection strategy.

The second selection strategy includes: selecting a second secondary carrier using a symmetrical frequency spectrum FDD as a candidate secondary carrier.

FDD refers to a duplex mode in which uplink transmission and downlink transmission use different carrier frequencies, but can send and receive at the same time, and FDD is regarded as a symmetrical spectrum.

Schematically, the SCS of the primary carrier is 15 KHz, and if the PUCCH is collided and is unavailable, the second secondary carrier with the symmetrical frequency spectrum FDD is used as the candidate secondary carrier.

Third selection strategy.

The third selection strategy includes: among the secondary carriers using the asymmetric spectrum TDD, selecting a third secondary carrier as the candidate secondary carrier according to an order of SCS from high to low.

TDD refers to a duplex mode in which uplink transmission and downlink transmission use the same carrier frequency and are only distinguished by time, and TDD is regarded as an asymmetric spectrum.

Schematically, the SCS of the primary carrier is 15 KHz. If the PUCCH is collided and is unavailable, and there are secondary carriers with SCS=120 KHz, 60 KHz, 30 KHz, and 15 KHz using asymmetric spectrum TDD, then in the order of SCS from high to low, a secondary carrier with SCS=120 KHz, a secondary carrier with SCS=60 KHz, a secondary carrier with SCS=30 KHz, and a secondary carrier with SCS=15 KHz are selected in sequence as the candidate secondary carrier.

Optionally, the priority of the first selection strategy is higher than that of the second selection strategy, and the priority of the second selection strategy is higher than that of the third selection strategy.

The priority of the selection strategy is used to indicate the order in which different selection strategies are considered when determining the candidate secondary carrier.

That is, the priority of the first selection strategy being higher than the priority of the second selection strategy, and the priority of the second selection strategy being higher than the priority of the third selection strategy means: considering the first selection strategy firstly to select the candidate secondary carrier, and if there is no corresponding first secondary carrier in the first selection strategy or the first secondary carrier is unavailable, then considering the second selection strategy to select the candidate secondary carrier, and in a case that there is no corresponding second secondary carrier in the second selection strategy or the second secondary carrier is unavailable, then considering the third selection strategy to select the candidate secondary carrier.

Schematically, the SCS of the primary carrier is 15 KHz. If the PUCCH is collided and is unavailable, in the case that there is a first secondary carrier with SCS=15 KHz, then the first secondary carrier is used as the candidate secondary carrier; in the case that there is no first secondary carrier with SCS=15 KHz, but there is a second secondary carrier using a symmetric spectrum FDD, then the second secondary carrier is used as the candidate secondary carrier; in the case that there is no first secondary carrier with SCS=15 KHz, and there is no second secondary carrier using the symmetric spectrum FDD, but there are a plurality of third secondary carriers using the asymmetric spectrum TDD, the third secondary carrier is selected according to the order of SCS from high to low as the candidate secondary carrier.

To sum up, in the carrier switching method provided by the embodiments of the present disclosure, in the carrier switching scenario of the physical channel, the terminal device selects the candidate secondary carrier based on the selection strategy to determine whether it is available. If there is the available resource on the candidate secondary carrier, the candidate secondary carrier is used as the target secondary carrier after carrier switching, so that when the physical channel resource of the primary carrier is unavailable, the carrier switching behavior of the terminal device is clarified, and the terminal device is helped to switch to an available target secondary carrier, thereby guaranteeing the reliability and timeliness of transmission on the physical channel.

At the same time, the carrier switching method provided by the embodiment of the present disclosure provides three selection strategies with different priorities, namely, the first selection strategy, the second selection strategy, and the third selection strategy, to help the terminal device select a suitable secondary carrier based on the above selection strategies to perform carrier switching, thereby improving the success rate of carrier switching.

Figure 4:
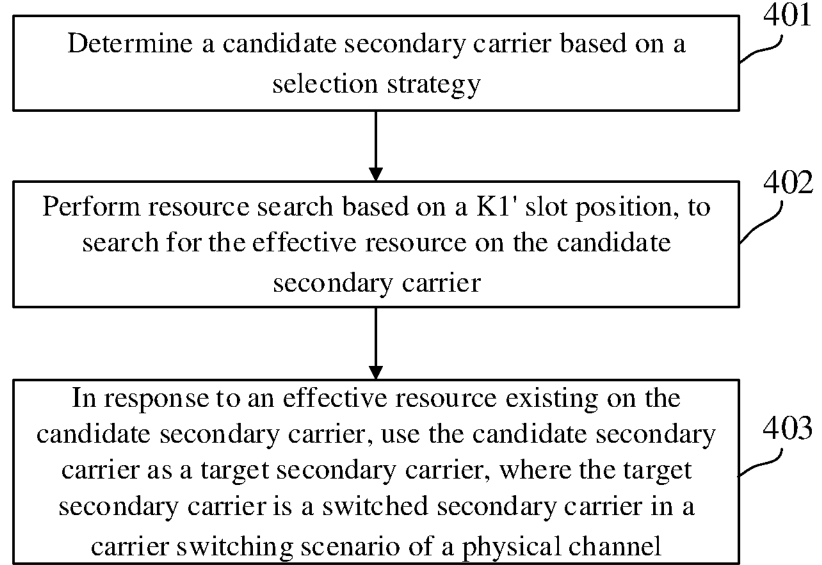
FIG. 4 shows a flowchart of a carrier switching method provided by another exemplary embodiment of the present disclosure.

In some embodiments, the terminal device searches for a resource on the candidate secondary carrier to determine whether there is an available resource. FIG. 4 is a flowchart of a carrier switching method provided by an exemplary embodiment of the present disclosure. Taking the method applied to a terminal device as an example, as shown in FIG. 4, the method includes the following steps.

In step 401: a candidate secondary carrier is determined based on a selection strategy.

For the specific implementation of this step, reference may be made to the above-mentioned step 301, and details are not described here.

In step 402: resource search is performed based on a K1' slot position, to search for the available resource on the candidate secondary carrier.

The K1' slot position is a slot position corresponding to the K1 slot position of the primary carrier on the candidate secondary carrier. That is, the terminal device determines the K1' slot position of the candidate secondary carrier based on the K1 slot position of the primary carrier, and performs resource search based on the K1' slot position to find the available resource on the candidate secondary carrier.

Optionally, the K1 slot position of the primary carrier is determined based on the K1 indication issued by the network device.

Optionally, the K1' slot position includes at least one slot position.

Hereinafter, several possible implementations of step 402 are exemplarily described.

The first possible implementation: in response to the SCS of the candidate secondary carrier being equal to the SCS of the primary carrier, the K1' slot position includes a first K1' slot position, and the first K1' slot position is equal to the K1 slot position; the terminal device searches sequentially from the first slot interval until it finds the available resource on the candidate secondary carrier, or until it reaches the first K1' slot position.

The first slot interval refers to a slot position when K1=1. Schematically, the network device sends downlink data to the terminal device at slot 0, and the first slot interval refers to slot 1.

The sequential search refers to searching according to the order of time domain positions from early to late. The sequential search may be referred to as: a forward seeking, a positive search, a forward search, a positive searching, a sequential searching, etc., which is not limited in the embodiments of the present disclosure.

That is, in the case that the first secondary carrier with the same SCS as the primary carrier is selected as the candidate secondary carrier based on the first selection strategy, the terminal device can determine one latest slot position on the candidate secondary carrier: the first K1' slot position, and the first K1' slot position is equal to the K1 slot position, the terminal device searches sequentially from the first slot interval until it finds an available resource on the candidate secondary carrier, or until it reaches the first K1' slot position.

Figure 5:
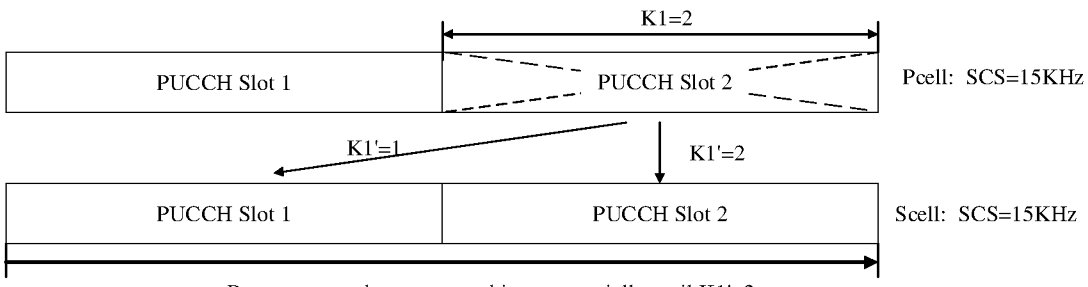
FIG. 5 shows a schematic diagram of resource search on a candidate secondary carrier provided by an exemplary embodiment of the present disclosure.

Schematically, with reference to FIG. 5, Pcell SCS=Scell SCS=15 KHz, then K1'=K1=2, the first K1' slot position is equal to K1 slot position and is equal to PUCCH slot 2, the first slot interval is the slot position when K1=1: PUCCH slot 1. Therefore, the terminal device searches for the resource sequentially from PUCCH slot 1 to PUCCH slot 2, and determines whether the available resource exists on the candidate secondary carrier with Scell SCS=15 KHz.

The second possible implementation: in response to the SCS of the candidate secondary carrier being greater than the SCS of the primary carrier, the K1' slot position includes the second K1' slot position and the third K1' slot position, and the value of the second K1' slot position is equal to the SCS of the candidate secondary carrier/the SCS of the primary carrier*(K1−1)+1, and the value of the third K1' slot position is equal to the SCS of the candidate secondary carrier/the SCS of the primary carrier*K1; the terminal device searches sequentially from the second K1' slot position until it finds an available resource on the candidate secondary carrier, or until it reaches the third K1' slot position.

The sequential search refers to searching according to the order of time domain positions from early to late. The sequential search may be referred to as: a forward search, a positive search, a forward searching, a positive searching, a sequential searching, etc., which is not limited in the embodiments of the present disclosure.

That is, in the case that a secondary carrier with the SCS being greater than that of the primary carrier is selected as the candidate secondary carrier based on the second selection strategy or the third selection strategy, the terminal device may determine one latest slot position on the candidate secondary carrier: the third K1' slot position, and one earliest slot position: the second K1' slot position, and the value of the second K1' slot position is equal to the SCS of the candidate secondary carrier/the SCS of the primary carrier*(K1−1)+1, the value of the third K1' slot position is equal to the SCS of the candidate secondary carrier/the SCS of the primary carrier*K1, and the terminal device searches from the second K1' slot position sequentially until an available resource on the candidate secondary carrier is found, or until the third K1' slot position is reached.

Figure 6:
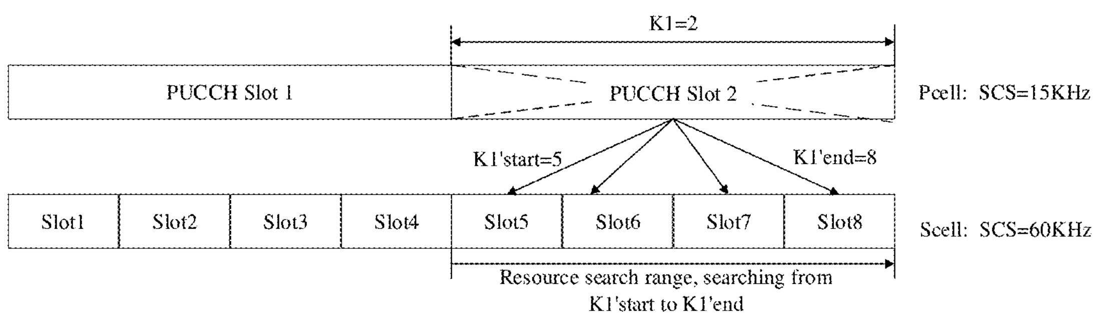
FIG. 6 shows a schematic diagram of resource search on a candidate secondary carrier provided by another exemplary embodiment of the present disclosure.

Schematically, with reference to FIG. 6, Pcell SCS=15 KHz, Scell SCS=60 KHz, K1=2, the second K1' slot position is denoted as K1'start, the third K1' slot position is denoted as K1'end, K1'start=(2−1)*4+1=5, and K1'end=2*4=8. Therefore, the terminal device searches for resources sequentially from PUCCH slot 5 to PUCCH slot 8, and determines whether the available resource exists on the candidate secondary carrier with Scell SCS=60 KHz.

The third possible implementation: in response to the SCS of the candidate secondary carrier being smaller than the SCS of the primary carrier, the K1' slot position includes the fourth K1' slot position, and the value of the fourth K1' slot position is equal to upward rounding of (the SCS of the candidate secondary carrier/the SCS of the primary carrier*K1); the terminal device searches sequentially from the first symbol position of the fourth K1' slot position until it finds and determines an available resource on the candidate secondary carrier, or until the last symbol position of the third K1' slot is reached.

The sequential search refers to searching according to the order of time domain positions from early to late. The sequential search may be referred to as: a forward search, a positive search, a forward searching, a positive searching, a sequential searching, etc., which is not limited in the embodiments of the present disclosure.

That is, in the case that a secondary carrier whose SCS is smaller than that of the primary carrier is selected as the candidate secondary carrier based on the second selection strategy or the third selection strategy, the terminal device can determine one slot position on the candidate secondary carrier: the fourth K1' slot position, and the fourth K1' slot position is equal to the upward rounding value of (the SCS of the candidate secondary carrier/the SCS of the primary carrier*K1), the terminal device starts searching from the first symbol position of the fourth K1' slot position sequentially until an available resource on the candidate secondary carrier is found and determined, or until the last symbol position of the third K1' slot is reached.

Figure 7:
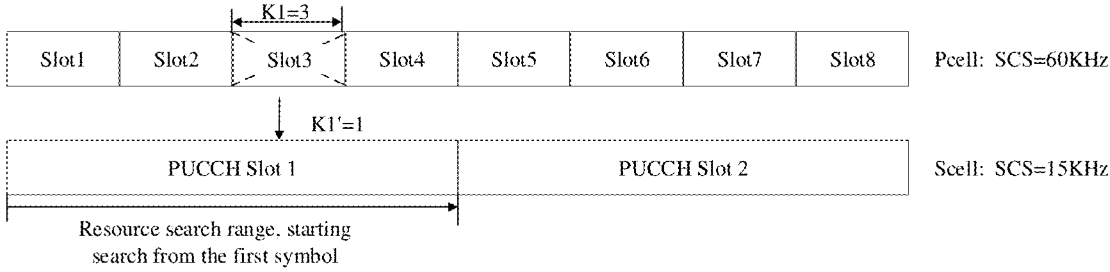
FIG. 7 shows a schematic diagram of resource search on a candidate secondary carrier provided by another exemplary embodiment of the present disclosure.

Schematically, with reference to FIG. 7, Pcell SCS=60 KHz, Scell SCS=15 KHz, K1=3, then K1'=[3*15/60]=1. Therefore, the terminal device searches for resources in order from the first symbol position to the last symbol position of PUCCH slot 1, and determines whether the available resource exists on the candidate secondary carrier with Scell SCS=15 KHz.

In the embodiment of the present disclosure, the exemplary description is given only by using the sequential search as the direction of resource search, and the direction of resource search can also be a reverse order search, the reverse order search referring to searching in the order of time domain positions from late to early. The reverse order search may be referred to as: a reverse searching, an inverse searching, a reverse order searching, a reverse searching, an inverse searching, etc., which is not limited in the embodiments of the present disclosure.

In the embodiment of the present disclosure, the exemplary illustration is given only by using the slot as the time domain unit for resource search. With the evolution of communication standards, the time domain unit for resource search may include: a sampling point, a symbol, a mini-slot, a slot, a multi-slot, a subframe, a radio frame, or a frame structure (frame), etc., which is not limited in the embodiment of the present disclosure.

In step 403: in response to an available resource existing on the candidate secondary carrier, the candidate secondary carrier is used as a target secondary carrier, where the target secondary carrier is a switched secondary carrier in a carrier switching scenario of a physical channel.

For the specific implementation of this step, reference may be made to the above-mentioned step 302, and details are not described here.

Optionally, after step 403, the terminal device may also perform the following step: performing transmission on a physical channel on the available resource of the target secondary carrier.

Schematically, the physical channel is PUCCH, and the terminal device performs carrier switching to switch to the target secondary carrier, and performs HARQ-ACK feedback on the PUCCH on the available resource of the target secondary carrier.

To sum up, in the carrier switching method provided by the embodiments of the present disclosure, in the carrier switching scenario of the physical channel, the terminal device selects the candidate secondary carrier based on the selection strategy to determine whether it is available. If there is the available resource on the candidate secondary carrier, the candidate secondary carrier is taken as the target secondary carrier after carrier switching, so that when the physical channel resource of the primary carrier is unavailable, the carrier switching behavior of the terminal device is clarified, and the terminal device is helped to switch to an available target secondary carrier, thereby guaranteeing the reliability and timeliness of transmission on the physical channel.

At the same time, in the carrier switching method provided by the embodiments of the present disclosure, the terminal device searches for resources on the candidate secondary carrier based on a certain rule, determines whether there is the available resource, and then performs carrier switching when there is the available resource, so as to avoid the situation that there is no available resource on the switched secondary carrier for transmission on the physical channel, thereby ensuring the reliability of carrier switching.

It should be noted that the above method embodiments may be implemented individually or in combination, which is not limited in the present disclosure.

The following are apparatus embodiments of the present disclosure, which can be used to implement the method embodiments of the present disclosure. For details not disclosed in the disclosed apparatus embodiments, the method embodiments in the present disclosure may be referred to.

Figure 8:
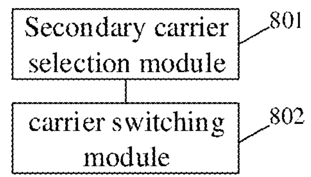
FIG. 8 shows a structural block diagram of a carrier switching apparatus provided by an exemplary embodiment of the present disclosure.

FIG. 8 is a structural block diagram of a carrier switching apparatus provided by an exemplary embodiment of the present disclosure. As shown in FIG. 8, the apparatus includes: a secondary carrier selection module 801 and a carrier switching module 802;

the secondary carrier selection module 801 is configured to determine a candidate secondary carrier based on a selection strategy;

the carrier switching module 802 is configured to use the candidate secondary carrier as a target secondary carrier in response to an available resource existing on the candidate secondary carrier, where the target secondary carrier is a switched carrier in a carrier switching scenario of a physical channel.

In an optional embodiment, the selection strategy includes: a first selection strategy;

the first selection strategy includes: selecting a first secondary carrier with the same SCS as the primary carrier as the candidate secondary carrier.

In an optional embodiment, the selection strategy further includes: a second selection strategy;

the second selection strategy includes: selecting a second secondary carrier using a symmetrical frequency spectrum FDD as the candidate secondary carrier.

In an optional embodiment, the selection strategy further includes: a third selection strategy;

the third selection strategy includes: among the secondary carriers using an asymmetric spectrum TDD, selecting a third secondary carrier according to an order of SCS from high to low as the candidate secondary carrier.

In an optional embodiment, the priority of the first selection strategy is higher than the priority of the second selection strategy, and the priority of the second selection strategy is higher than the priority of the third selection strategy.

In an optional embodiment, the apparatus further includes: a resource search module;

the resource search module is configured to perform a resource search based on a K1' slot position, and search for the available resource on the candidate secondary carrier;

where the K1' slot position is a slot position corresponding to a K1 slot position of the primary carrier on the candidate secondary carrier.

In an optional embodiment, in response to that the SCS of the candidate secondary carrier is equal to the SCS of the primary carrier, the K1' slot position includes a first K1' slot position, and the first K1' slot position is equal to the K1 slot position;

the resource search module is configured to search sequentially from the first slot interval until the available resource on the candidate secondary carrier is found, or until the first K1' slot position is reached.

In an optional embodiment, in response to the SCS of the candidate secondary carrier being greater than the SCS of the primary carrier, the K1' slot position includes a second K1' slot position and a third K1' slot position, a value of the second K1' slot position is equal to the SCS of the candidate secondary carrier/the SCS of the primary carrier*(K1−1)+1, and the value of the third K1' slot position is equal to the SCS of the candidate secondary carrier/the SCS of the primary carrier*K1;

the resource search module is configured to sequentially search from the second K1' slot position until the available resource on the candidate secondary carrier is found, or until the third K1' slot position is reached.

In an optional embodiment, in response to the SCS of the candidate secondary carrier being smaller than the SCS of the primary carrier, the K1' slot position includes a fourth K1' slot position, and the value of the fourth K1' slot position is equal to the upward rounding of (SCS of the candidate secondary carrier/SCS of the primary carrier*K1);

the resource search module is configured to sequentially search from the first symbol position of the fourth K1' slot position until the available resource on the candidate secondary carrier is found and determined, or until the last symbol position of the third K1' slot is reached.

In an optional embodiment, the apparatus further includes: a transmission module;

the transmission module is configured to perform transmission on the physical channel on the available resource of the target secondary carrier.

In an optional embodiment, the physical channel includes at least any one of the following: PUCCH; PUSCH; PDCCH; PDSCH.

Figure 9:
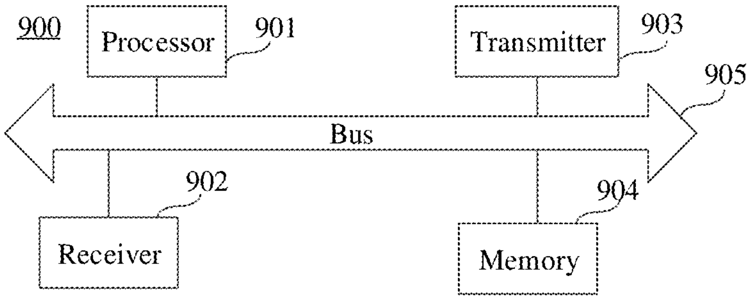
FIG. 9 shows a structural block diagram of a terminal device according to an exemplary embodiment of the present disclosure.

FIG. 9 shows a schematic structural diagram of a terminal device 900 provided by an exemplary embodiment of the present disclosure. The communication device 900 includes: a processor 901, a receiver 902, a transmitter 903, a memory 904 and a bus 905.

The processor 901 includes one or more processing cores, and the processor 901 executes various functional applications and information processing by running software programs and modules.

The receiver 902 and the transmitter 903 can be implemented as one communication component, and the communication component can be one communication chip.

The memory 904 is connected to the processor 901 through the bus 905.

The memory 904 may be used to store at least one instruction, and the processor 901 is used to execute the at least one instruction, so as to implement various steps in the foregoing method embodiments.

In addition, the memory 904 can be realized by any type of volatile or non-volatile storage device or their combination, The volatile or non-volatile storage device includes but not limited to: a magnetic disk or an optical disk, an Electrically Erasable Programmable Read Only Memory (EEPROM), an Erasable Programmable Read Only Memory (EPROM), a Static Random Access Memory (SRAM), a Read-Only Memory (ROM), a magnetic memory, a flash memory, a Programmable Read-Only Memory (PROM).

An exemplary embodiment of the present disclosure further provides a chip, the chip includes a programmable logic circuit and/or program instructions, and when the chip is running, it is used to implement the carrier switching method provided by the above method embodiments.

An exemplary embodiment of the present disclosure also provides a computer-readable storage medium, the computer-readable storage medium stores at least one instruction, at least one program, a code set or an instruction set, the at least one instruction, the at least one segment of program, the code set or the instruction set is loaded and executed by the processor to implement the carrier switching method provided by the above method embodiments.

It should be understood that the "a plurality of" mentioned herein refers to two or more than two. "And/or" describes the association relationship of associated objects, indicating that there may be three types of relationships, for example, A and/or B may indicate: A exists alone, A and B exist simultaneously, and B exists alone. The character "/" generally indicates that the contextual objects are an "or" relationship.

Other implementations of the present disclosure will be readily apparent to those skilled in the art from consideration of the specification and practice of the disclosure herein. The present disclosure is intended to cover any modification, use or adaptation of the present disclosure. These modifications, uses or adaptations follow the general principles of the present disclosure and include common knowledge or conventional technical means in the technical field not disclosed in the present disclosure. The specification and embodiments are to be considered exemplary only, with a true scope and spirit of the present disclosure being indicated by the appended claims.

It should be understood that the present disclosure is not limited to the precise constructions which have been described above and shown in the drawings, and various modifications and changes may be made without departing from the scope thereof. The scope of the present disclosure is limited only by the appended claims.

What is claimed is:

1. A carrier switching method, comprising:

determining a candidate secondary carrier based on a selection strategy;

in response to a subcarrier spacing (SCS) of the candidate secondary carrier being equal to a SCS of a primary carrier, searching sequentially from a first slot interval until an available resource on the candidate secondary carrier is found, or until a first K1' slot position is reached; wherein the first slot interval is a slot position corresponding to when K1 is equal to 1, a K1' slot position comprises the first K1' slot position, and the first K1' slot position is equal to a K1 slot position, wherein the K1' slot position is a slot position corresponding to the K1 slot position of the primary carrier on the candidate secondary carrier, wherein K1 and K1' are positive integers; and in response to an available resource existing on the candidate secondary carrier, determining the candidate secondary carrier as a target secondary carrier, wherein the target secondary carrier is a switched secondary carrier in a carrier switching scenario of a physical channel.

2. The method according to claim 1, wherein the selection strategy comprises at least one of: a first selection strategy, a second selection strategy, or a third selection strategy;

wherein the first selection strategy comprises: selecting a first secondary carrier with a same SCS as the primary carrier as the candidate secondary carrier;

the second selection strategy comprises: selecting a second secondary carrier using a symmetrical frequency spectrum as the candidate secondary carrier; and the third selection strategy comprises: selecting a third secondary carrier in a descending order of SCS among secondary carriers using an asymmetric spectrum, as the candidate secondary carrier.

3. The method according to claim 2, wherein a priority of the first selection strategy is higher than a priority of the second selection strategy.

4. The method according to claim 2, wherein a priority of the second selection strategy is higher than a priority of the third selection strategy.

5. The method according to claim 1, wherein a SCS of the candidate secondary carrier is greater than a SCS of the primary carrier, the K1' slot position comprises a second K1' slot position and a third K1' slot position, a value of the second K1' slot position is equal to the SCS of the candidate secondary carrier/the SCS of the primary carrier*(K1−1)+1, and a value of the third K1' slot position is equal to the SCS of the candidate secondary carrier/the SCS of the primary carrier/*K1;

the method further comprises:

searching sequentially from the second K1' slot position until the available resource on the candidate secondary carrier is found, or until the third K1' slot position is reached.

6. The method according to claim 1, wherein a SCS of the candidate secondary carrier is smaller than a SCS of the primary carrier, the K1' slot position comprises a fourth K1' slot position, a value of the fourth K1' slot position is equal to upward rounding of (the SCS of the candidate secondary carrier/the SCS of the primary carrier*K1);

the method further comprises:

searching sequentially from a first symbol position of the fourth K1' slot position until the available resource on the candidate secondary carrier is found and determined, or until a last symbol position of the fourth K1' slot position is reached.

7. The method according to claim 1, further comprising:

performing transmission on the physical channel on the available resource of the target secondary carrier.

8. The method according to claim 1, wherein the physical channel comprises at least one of:

a physical uplink control channel (PUCCH);

a physical uplink shared channel (PUSCH);

a physical downlink control channel (PDCCH); or a physical downlink shared channel (PDSCH).

9. A carrier switching apparatus, comprising:

a processor; and a memory storing instructions executable by the processor, wherein the processor is configured to:

determine a candidate secondary carrier based on a selection strategy;

in response to a subcarrier spacing (SCS) of the candidate secondary carrier being equal to a SCS of a primary carrier, search sequentially from a first slot interval until an available resource on the candidate secondary carrier is found, or until a first K1' slot position is reached, wherein the first slot interval is a slot position when K1 is equal to 1, a K1' slot position comprises the first K1' slot position, and the first K1' slot position is equal to a K1 slot position, wherein the K1' slot position is a slot position corresponding to the K1 slot position of the primary carrier on the candidate secondary carrier, wherein K1 and K1' are positive integers; and determine the candidate secondary carrier as a target secondary carrier in response to an available resource existing on the candidate secondary carrier, wherein the target secondary carrier is a switched secondary carrier in a carrier switching scenario of a physical channel.

10. The apparatus according to claim 9, wherein the selection strategy comprises at least one of: a first selection strategy; a second selection strategy; or a third selection strategy;

wherein the first selection strategy comprises: selecting a first secondary carrier with a same SCS as the primary carrier as the candidate secondary carrier;

the second selection strategy comprises: selecting a second secondary carrier using a symmetrical frequency spectrum as the candidate secondary carrier; and the third selection strategy comprises: selecting a third secondary carrier in a descending order of SCS among secondary carriers using an asymmetric spectrum, as the candidate secondary carrier.

11. The apparatus according to claim 10, wherein a priority of the first selection strategy is higher than a priority of the second selection strategy.

12. The apparatus according to claim 10, wherein a priority of the second selection strategy is higher than a priority of the third selection strategy.

13. The apparatus according to claim 9, wherein a SCS of the candidate secondary carrier is greater than a SCS of the primary carrier, the K1' slot position comprises a second K1' slot position and a third K1' slot position, a value of the second K1' slot position is equal to the SCS of the candidate secondary carrier/the SCS of the primary carrier*(K1−1)+1, and a value of the third K1' slot position is equal to the SCS of the candidate secondary carrier/the SCS of the primary carrier/*K1; and the processor is further configured to search sequentially from the second K1' slot position until the available resource on the candidate secondary carrier is found, or until the third K1' slot position is reached.

14. The apparatus according to claim 9, wherein a SCS of the candidate secondary carrier is smaller than a SCS of the primary carrier, the K1' slot position comprises a fourth K1' slot position, a value of the fourth K1' slot position is equal to upward rounding of (the SCS of the candidate secondary carrier/the SCS of the primary carrier*K1); and the processor is further configured to search sequentially from a first symbol position of the fourth K1' slot position until the available resource on the candidate secondary carrier is found and determined, or until a last symbol position of the fourth K1' slot position is reached.

15. The apparatus according to claim 9, wherein the processor is further configured to:

perform transmission on the physical channel on the available resource of the target secondary carrier.

16. The apparatus according to claim 9, wherein the physical channel comprises at least one of:

a physical uplink control channel (PUCCH);

a physical uplink shared channel (PUSCH);

a physical downlink control channel (PDCCH); or a physical downlink shared channel (PDSCH).

* * * * *